United States Patent
Geißenhöner et al.

(10) Patent No.: US 10,988,008 B2
(45) Date of Patent: Apr. 27, 2021

(54) FOLDING TOP FOR A VEHICLE

(71) Applicant: Dr. Ing. h.c. F. Porsche Aktiengesellschaft, Stuttgart (DE)

(72) Inventors: Kai Geißenhöner, Vaihingen (DE); Markus Alexander Bauer, Heusenstamm (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 56 days.

(21) Appl. No.: 16/537,764

(22) Filed: Aug. 12, 2019

(65) Prior Publication Data
US 2020/0079196 A1  Mar. 12, 2020

(30) Foreign Application Priority Data
Sep. 12, 2018 (DE) .......................... 102018122238.6

(51) Int. Cl.
*B60J 7/12* (2006.01)

(52) U.S. Cl.
CPC .................. *B60J 7/1247* (2013.01)

(58) Field of Classification Search
CPC ..................................................... B60J 7/1247
USPC ........................... 296/107.11, 107.12, 107.07
See application file for complete search history.

(56) References Cited

U.S. PATENT DOCUMENTS

| | | | |
|---|---|---|---|
| 6,302,471 B1 | 10/2001 | Windpassinger et al. | |
| 6,431,635 B2* | 8/2002 | Nicastri | B60J 7/1265 296/107.09 |
| 6,866,322 B2* | 3/2005 | Willard | B60J 1/1815 296/107.01 |
| 8,302,484 B2 | 11/2012 | Henzler et al. | |
| 8,789,871 B2 | 7/2014 | Armbruster | |
| 8,899,657 B2 | 12/2014 | Braun et al. | |
| D731,952 S | 6/2015 | Larson | |
| D852,726 S | 7/2019 | Varga | |
| 2007/0205630 A1* | 9/2007 | Hollenbeck | B60J 7/1204 296/107.04 |
| 2009/0167050 A1 | 7/2009 | Respondek et al. | |
| 2010/0026040 A1 | 2/2010 | Froschle et al. | |
| 2014/0008934 A1 | 1/2014 | Froeschle et al. | |

FOREIGN PATENT DOCUMENTS

| | | |
|---|---|---|
| DE | 102011014693 A1 | 9/2012 |
| DE | 102011014694 A1 | 9/2012 |

OTHER PUBLICATIONS

Great Britain Combined Search and Examination Report for GB Application No. 1912919.6, dated Feb. 11, 2020, 4 pages.
Design U.S. Appl. No. 29/662,517, by Larson, filed Sep. 6, 2018.

* cited by examiner

*Primary Examiner* — Joseph D. Pape
(74) *Attorney, Agent, or Firm* — RatnerPrestia

(57) ABSTRACT

A folding top for a vehicle includes a folding top fabric for covering a vehicle interior in a closed position and opening up the vehicle interior in an open position. The folding top has an A pillar portion for mechanical connection to an A pillar of the vehicle, a C pillar portion for mechanical connection to a C pillar of the vehicle, a B pillar portion between the A pillar portion and the C pillar portion for lateral connection to a B pillar of the vehicle. A tensioning cable extends from the A pillar portion via the B pillar portion into the C pillar portion on each side of the folding top fabric in order to tension the folding top fabric in the closed position.

8 Claims, 3 Drawing Sheets

FOLDING TOP FOR A VEHICLE

CROSS-REFERENCE TO RELATED APPLICATION

This application claims priority to German Patent Application No. 10 2018 122 238.6, filed Sep. 12, 2018, the content of such application being incorporated by reference herein in its entirety.

FIELD OF THE INVENTION

The present invention relates to a folding top for a vehicle, comprising a folding top fabric, and to a vehicle having such a folding top.

BACKGROUND OF THE INVENTION

It is known that vehicles are equipped with folding tops in order to close or to cover a vehicle interior in a closed position and to open up the vehicle interior in an open position.

Such vehicles are also called convertibles. In the known solutions, said folding tops are produced either from metallic materials or from fabric materials. If a fabric material is used as the folding top fabric, the folding top fabric is brought into a defined folding position in the open position in order to stow the folding top fabric and therefore the entire folding top in the open position in as space-saving a manner as possible in the rear region of the vehicle. In the closed position which is adopted for a desired covering of the vehicle interior in poor weather or for other reasons, the folding top fabric is stretched and pulled over the entire vehicle interior. The folding top fabric can therefore be moved to and fro between a folded and an unfolded or tensioned position. In order to ensure the tensioning, in the known solutions for the folding top fabric, a tensioning cable is provided which conventionally runs from the A pillar of the vehicle to the B pillar of the vehicle along a window frame of the second window. This leads to a tensioned folding top being able to be provided simply and cost-effectively. However, this leads to the problem that, with a simple folding mechanism, an arrangement of the folds of the folding top fabric may arise behind the B pillar in the region toward the C pillar. To keep said arrangement of the folds as small as possible is highly complex and in particular complicates the folding mechanisms for moving the folding top between the closed position and the open position. Furthermore, the arrangement of the folds will lead at high speeds to an undesired change in the wind resistance and to fluttering noises.

SUMMARY OF THE INVENTION

It would be desirable to at least partially eliminate the disadvantages described above. In particular, it would be desirable to ensure smoothing of the folding top fabric in the closed position between the B pillar and the C pillar of the vehicle in a cost-effective and simple is manner.

Features and details which are described in conjunction with the folding top according to aspects of the invention also apply, of course, in conjunction with the vehicle according to aspects of the invention and vice versa in each case, and therefore reference is or can be made constantly from one to the other in respect of the disclosure of the individual aspects of the invention.

A folding top according to aspects of the invention for a vehicle is equipped with a folding top fabric for covering a vehicle interior in a closed position and opening up the vehicle interior in an open position. For this purpose, the folding top has an A pillar portion for mechanical connection to an A pillar of the vehicle. Furthermore, a C pillar portion is provided for mechanical connection to a C pillar of the vehicle. A B pillar portion extends between the A pillar portion and the C pillar portion for lateral connection to a B pillar of the vehicle. A tensioning cable extends from the A pillar portion via the B pillar portion into the C pillar portion on each side of the folding top fabric in order to tension the folding top fabric in the closed position.

According to aspects of the invention, a folding top is therefore based on the use of a fabric material for the folding top fabric. It is suitable in the closed position to at least partially cover the vehicle interior from above. In the open position, the vehicle interior is at least partially opened up, i.e. the folding top fabric is in a folded up position. In order, in the closed position, to be able to introduce as high a tensioning force as possible into the folding top fabric, a tensioning cable is provided on each side of the folding top fabric, i.e. a total of at least two tensioning cables are provided on the folding top fabric. Said tensioning cables serve to tension or to smooth the folding top fabric in the closed position.

In a manner according to aspects of the invention, the smoothing now takes place over the entire region of the folding top fabric. This should be understood as meaning in particular that the tensioning cable not only extends between the A pillar portion and the B pillar portion, but, furthermore, it continues into the C pillar portion. As will also be explained further on, the respective tensioning cable is extended in particular from the beginning of the A pillar portion as far as the rear end of the C pillar portion, and therefore the desired tensioning functionality of the tensioning cable can also be ensured and provided substantially over the entire profile in the longitudinal direction of the vehicle.

Within the context of the present invention, mechanical connection at the A pillar portion to the A pillar or at the C pillar portion to the C pillar should be understood as meaning any form of mechanical connection. This may include, for example, purely passive support on a corresponding mechanical stop. However, it is preferred if the respective mechanical connection signifies a mechanical fastening, i.e., for example, a force-transmitting fastening with regard to tension and to compression becomes possible. This can be ensured, for example, by mechanical latching in corresponding mating latching regions of the A pillar and the C pillar.

In the A pillar portion and in the C pillar portion, and also in the B pillar portion located in between, all contact regions with the vehicle or with side surfaces or with windows of the vehicle are preferably sealed against wind penetration and/or against water penetration. Therefore, even at high vehicle speeds or during the movement of the vehicle under adverse weather conditions, a sealed and comfortable vehicle interior can be ensured.

Owing to the fact that, with the aid of the tensioning cable, the folding top fabric can now be acted upon with a corresponding tensioning force over the entire region, in particular even in the rear C pillar portion of the folding top, a greater freedom from folds in particular in this region is ensured. In addition to a significant improvement in respect of visual aspects, this leads to the folding top maintaining greater stability even at high speeds. Not least, undesirable fluttering noises at the folding top are also reduced at high speeds since an undesired formation of folds is avoided and therefore a smaller engagement surface for the headwind is provided.

In the present invention, the terms A pillar, B pillar and C pillar should be understood as meaning the conventional technical jargon in vehicles. Thus, the A pillar within the context of the present invention is the region of the windshield or of the lateral body surround of the windshield. The C pillar is the rearmost portion of the vehicle, in which the folding top merges again into the body, in particular into the region of the trunk of the vehicle. The B pillar lies between the A pillar and the C pillar and, within the context of the present invention, defines the region of the vehicle behind the front lateral door of the vehicle, i.e. the driver's door or the front passenger's door.

The fact that the tensioning cable extends laterally on the folding top fabric should be is understood as meaning in particular a portion of the folding top fabric, said portion having an at least partially vertical orientation with respect to the roadway-facing underside of the vehicle in the normal driving position of the vehicle. A lateral tensioning can therefore be provided via a corresponding tensioning frame. The folding top is preferably connected with the folding top fabric to a folding mechanism, or the folding top has said folding mechanism which is capable of carrying out the desired movement between the closed position and the open position. The tensioning cable serves to apply a tensioning force via said folding mechanism and to ensure the freedom from folds over a large part of the folding top fabric in the manner explained.

Advantages are afforded if, in the case of a folding top according to aspects of the invention, the tensioning cable extends from a front mechanical coupling device in the A pillar portion as far as a rear mechanical coupling device in the C pillar portion. A front mechanical coupling device and/or a rear mechanical coupling device should be understood as meaning in particular components of the folding mechanism system explained in the previous paragraph. They can serve for passive support, but also for active latching or hooking in the respective A pillar or C pillar. The extension of the tensioning cable, in particular in a force-transmitting manner, to said respective coupling devices serves to introduce the force into the body in the closed state, i.e. in the closed position, for bracing the folding top fabric. In other words, the tensioning force for tensioning the folding top and the folding top fabric in the closed position can be absorbed or provided by the body of the vehicle. The body can therefore be provided as an abutment for bracing the folding top fabric.

It is likewise of advantage if, in the case of a folding top according to aspects of the invention, a fabric pocket in which the tensioning cable runs is formed at least in sections at least in the C pillar portion, preferably in all of the portions of the folding top fabric.

This means that said fabric pocket is designed to as it were cover or to receive the steel cable. In addition to covering the latter and therefore blocking it from view, the fabric pocket can thus also be provided for a defined positioning and/or even guidance of the steel cable. It is therefore ensured that the steel cable remains in the desired position even during the movement between the closed position and the open position, and therefore, even during movement of any desired frequency into the closed position, the desired tensioning functionality can always be taken up and provided again in a defined manner.

Further advantages are afforded if, in the case of a folding top according to aspects of the invention, a folding fabric surface is arranged in the fabric pocket in the closed position for releasing additional folding top fabric during the folding into the open position. Such a folding fabric surface is therefore a fabric residue or an additional fabric portion which is not required in the tensioning position. Said tensioning position defines the closed position. As soon as a folding movement has to be carried out, the relative positions of individual portions and individual regions of the folding top fabric with respect to one another change. Owing to the fact that a folding fabric surface is now additionally provided in a concealed manner, said folding fabric surface can also provide or enable complicated folding maneuvers of the mechanical lever system located therebelow without the folding top fabric being overstretched. The complexity of the mechanism is therefore provided with it having less influence on the actual configuration of the folding top fabric. In other words, in this embodiment, tension-free or low-tension folding into the open position of the folding top becomes possible simply and cost-effectively.

Further advantages are afforded if, in the case of a folding top according to aspects of the invention, the C pillar portion has different materials on different sides of the tensioning cable, in particular in respect of at least one of the following material properties:
  transparency color
  elasticity
  wind permeability.

The above enumeration is not a definitive list. The different materials relate here to the choice of materials on the roof side with respect to the choice of materials on the window side of the folding top fabric. A different optical and also mechanical effect of the folding top fabric can therefore be ensured. For example, a C pillar window can be constituted by the degree of transparency in the side portion of the C pillar portion being greater than in the roof portion of the C pillar portion. However, other embodiments, such as, for example, air permeability, the number of different layers or the like, can also make it possible to realize a higher degree of complexity or different comfort features within the context of the present invention.

It is furthermore of advantage if, in the case of a folding top according to aspects of the invention, the folding top fabric and the two lateral tensioning cables are formed symmetrically or substantially symmetrically. The symmetry is preferably formed here along the center axis of the vehicle. This leads to a significantly simplified production of such a folding top or of a corresponding vehicle. The optical effect of such a vehicle can thereby also be improved. The tensioning effect which in this way is likewise introduced into the folding top fabric in a symmetrical configuration from both sides is likewise of symmetrical design, and therefore, for the action of the tensioning forces, an advantageous profile or an advantageous distribution of tensioning forces can be formed in the folding top fabric.

Advantages are furthermore afforded if, in the case of a folding top according to aspects of the invention, the B pillar portion has a window guide for a side window of the vehicle. This is of advantage in particular in what is referred to as a two-seater convertible or a two+ two-seater convertible which has only two side doors, i.e. one side door per side. Said window guide is in particular a mechanical window guide which can be designed either for receiving the window in its closed position and/or for guiding the window during the movement into the closed position. It therefore permits the lateral window to be mechanically supported in a corresponding window guide of the folding top. The window guide can be provided here in a metallic basic component of a lever system and/or at least partially also by means of the folding top fabric.

It is likewise of advantage if, in the case of a folding top according to the previous paragraph, the window guide encloses an acute angle with the tensioning cable. This makes it possible to improve the tensioning profile for the desired freedom from folds in the folding top fabric in the C pillar portion even further. Furthermore, this leads to the fact that, irrespective of the open position or the closed position of the lateral window, the stabilization can also be provided with improved force ratios for the C pillar portion and the folding top fabric present there.

Further advantages can be afforded if, in the case of a folding top according to aspects of the invention, the tensioning cable is fastened to a rear tensioning bow in the C pillar portion. Such a rear tensioning bow is in particular part of a rear mechanical coupling device, as has already been explained. It can be part of a mechanical basic structure or of the mechanical lever system which has already been explained.

The present invention likewise relates to a vehicle having a folding top according to aspects of the invention. A vehicle according to aspects of the invention therefore affords the same advantages as have been explained in detail with regard to a folding top according to aspects of the invention.

BRIEF DESCRIPTION OF THE DRAWINGS

Further advantages, features and details of the invention emerge from the description below in which exemplary embodiments of the invention are described in detail with reference to the drawings. The features mentioned in the claims and in the description may here be essential to the invention in each case individually by themselves or in any desired combination. In the drawings, schematically:

DETAILED DESCRIPTION OF THE INVENTION

Figure 1:
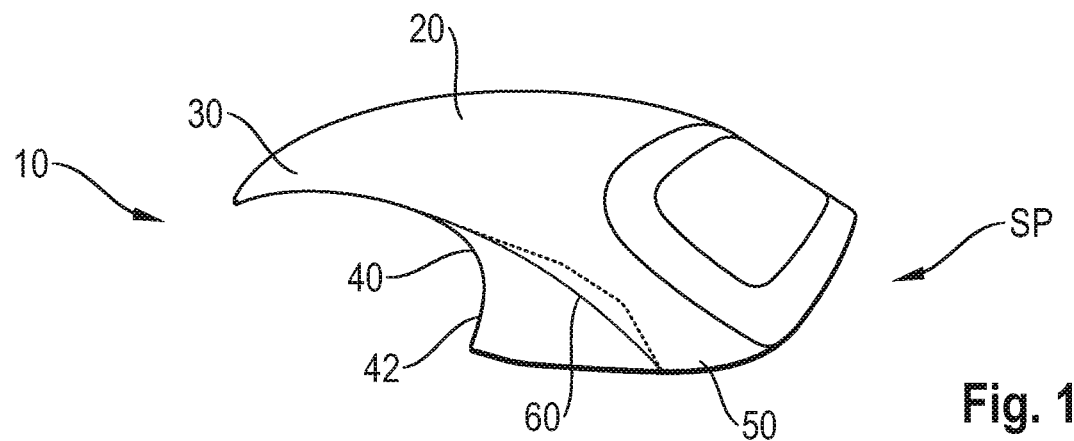
FIG. 1 shows an embodiment of a folding top according to aspects of the invention in the closed position.
Figure 2:
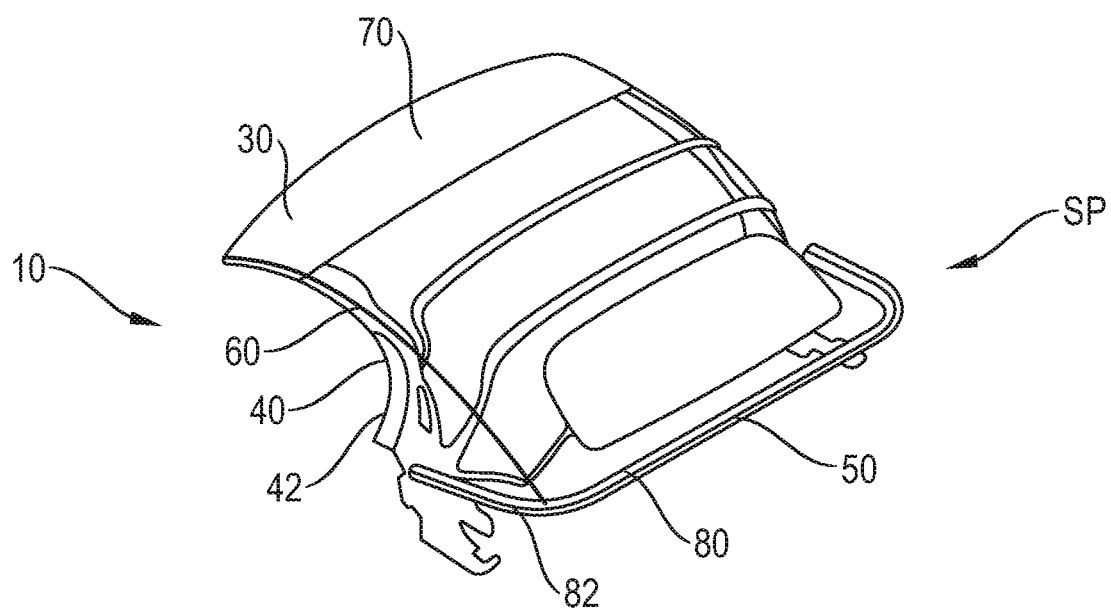
FIG. 2 shows the mechanical brace located therebelow of the embodiment of FIG. 1.

FIGS. 1 and 2 show a folding top 10 in the closed position SP. In the closed position SP, the folding top 10 comprising the folding top fabric 20 is stretched. FIG. 2 shows the basic brace or a mechanical lever system which is capable of being able to move the folding top fabric 20 to and fro between the closed position SP illustrated and an open position, not illustrated. This should therefore be understood as folding into the open position and unfolding and tensioning into the closed position SP.

Figure 4:
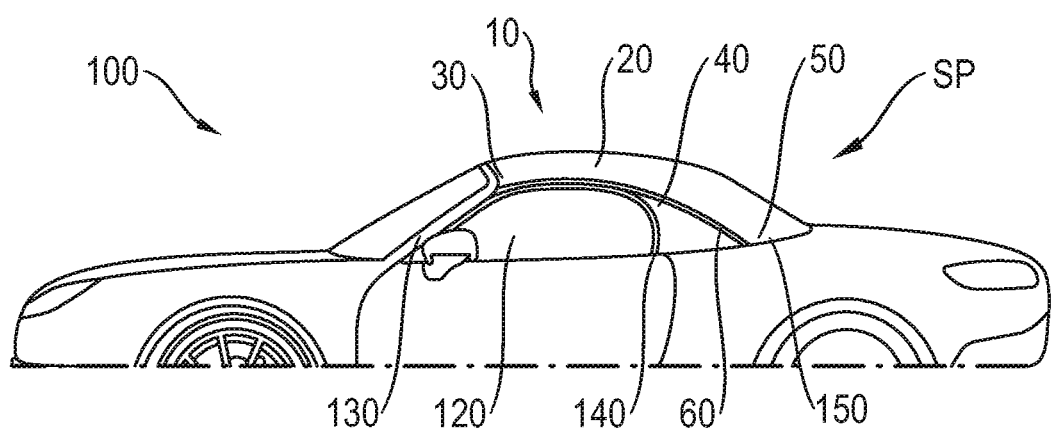
FIG. 4 shows an embodiment of a vehicle according to aspects of the invention.

In the closed position SP, as has been illustrated in FIGS. 1 and 2, the mechanical lever system according to FIG. 4 therefore shows an unfolded state. This means that a front mechanical coupling device 70 is arranged in the region of the A pillar portion 30. In this embodiment, said front mechanical coupling device 70 serves to ensure mechanical coupling and therefore latching to a corresponding A pillar 130 of a vehicle 100. A tensioning bow 82 is formed here on the rear mechanical coupling device 80. Said rear mechanical coupling device 80 also serves for mechanical latching in a corresponding C pillar 150 of the vehicle 100.

In order now to ensure that the folding top fabric 20 of the folding top 10 has a high degree of tensioning and a high freedom from folds in the entire region, in particular in the A pillar portion 30, in the B pillar portion 40 and also in the C pillar portion 50, according to the present invention a tensioning cable 60 is formed here on both sides, illustrated on the left-hand side of the folding top 10. Said tensioning cable 60 extends from the A pillar portion 30 through the B pillar portion 40 as far as the C pillar portion 50. For this purpose, the tensioning cable 60 is mechanically fastened in the region of the front mechanical coupling device 70 and in the region of the rear mechanical coupling device 80, in particular in the region of the tensioning bow 82.

As can likewise be seen, in the case of the mechanical lever system according to FIG. 2, the B pillar portion 40 is equipped with a window guide 42. In the closed position SP, the tensioning cable 60 encloses an acute angle with said window guide 42 in order thereby to obtain the freedom from folds with an even better distribution of tensioning force in the folding top fabric 20.

FIG. 4 illustrates how a vehicle 100 with such an embodiment of a folding top 10 behaves. In the closed position SP illustrated, it can readily be seen how a side window 120 separates the A pillar 130 from the B pillar 140 of the vehicle. The C pillar 150 is moreover found behind the B pillar 140. A partial region of the folding top fabric 20 of the folding top 10 extends between the B pillar 140 and the C pillar 150. Accordingly, the tensioning cable 60 also extends here into the C pillar portion 50, and therefore the folding top fabric 20 also has the desired tensioning force in the B pillar portion 40 and in the C pillar portion 50.

Figure 5:
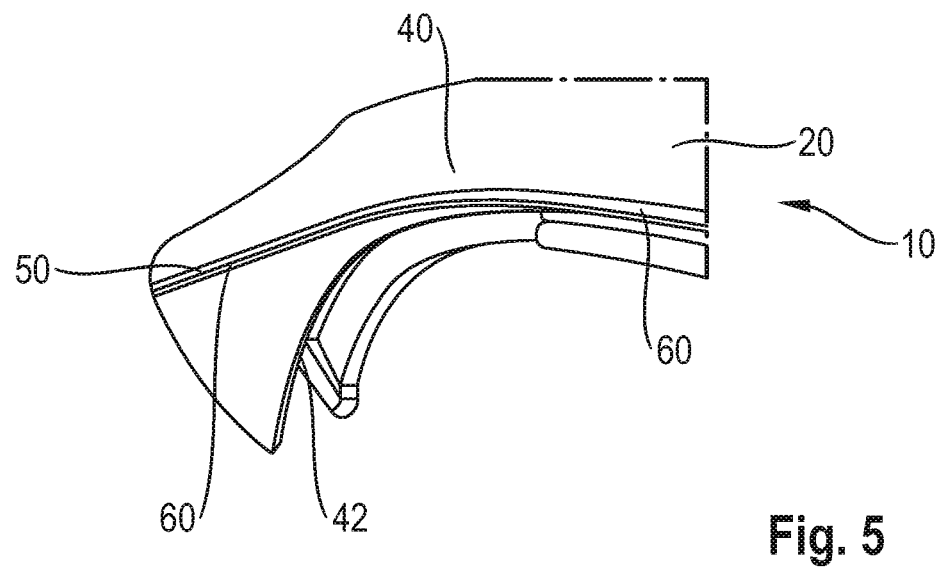
FIG. 5 shows a detailed illustration of a folding top according to the embodiment of FIG. 4.

FIG. 5 shows a partial illustration of FIG. 4. It can once again readily be seen here how, in this case, the tensioning cable 60 runs in an outer pocket 90 as far as the C pillar portion 50 via the B pillar portion 40. The correlation with the window guide 42 in the B pillar portion 40 can readily also be seen here.

Figure 3:
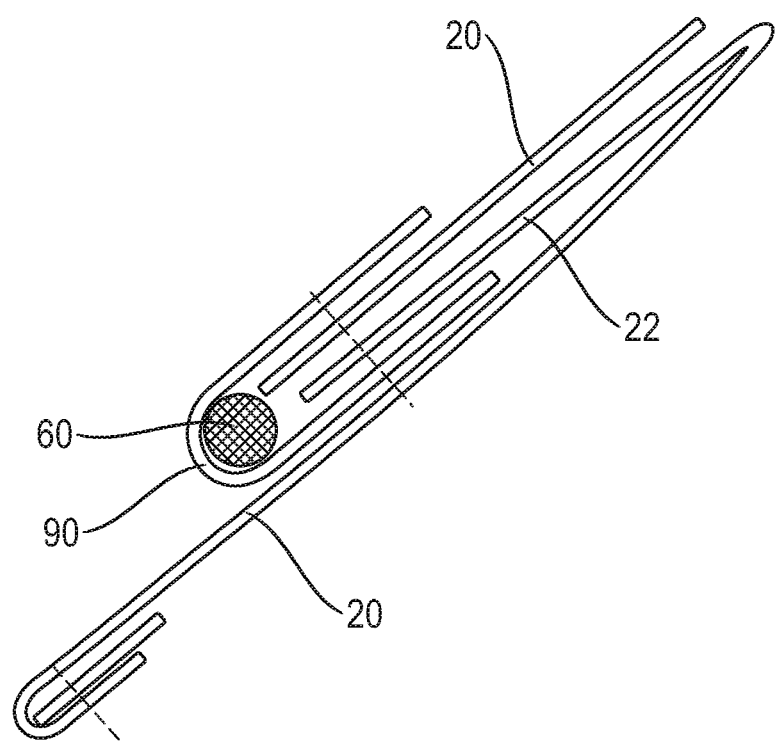
FIG. 3 shows an embodiment of a fabric pocket according to aspects of the invention.

FIG. 3 shows a partial embodiment illustrating the fabric pocket 90, as can also be gathered, for example, from FIG. 5. The tensioning cable 60 is accommodated in said fabric pocket 90. The accommodating of the tensioning cable 60 provides firstly a defined positioning and secondly guidance of the tensioning cable 60 during the movement between the closed position SP and a corresponding open position of the folding top 10. In order to ensure that, during the folding operation, undesired overtensioning or overstretching of the folding top fabric 20 is prevented, a folding fabric surface 22 is provided here which, as it were as a reserve fabric surface, can enable even complex folding movements and thereby avoids an undesirable overstretching of the folding top fabric 20.

The above explanation of the embodiments describes the present invention exclusively within the scope of examples. Of course, individual features of the embodiments, if technically expedient, can be freely combined with one another without departing from the scope of the present invention.

What is claimed is:
1. A folding top for a vehicle comprising:
   a folding top fabric for at least partially concealing a vehicle interior in a closed position and opening up the vehicle interior in an open position, a forward portion of the folding top fabric defining a front edge of the folding top that is positionable against an A-pillar of a vehicle, a rear portion of the folding top fabric defining a rear edge of the folding top and positioned rearward of the forward portion in the closed position of the folding top, a central portion of the folding top fabric, which is disposed between the forward portion and the rear portion in the closed position of the folding top, a tensioning cable that extends from the forward portion via the central portion into the rear portion of the folding top fabric in order to tension the folding top fabric in the closed position, a fabric pocket formed by folded fabric material, in which the tensioning cable extends, that is formed in all of the portions of the folding top fabric, and a folding fabric sheet arranged within the fabric pocket in the closed position and configured to release additional folding top fabric during folding of the fabric top into the open position.

2. The folding top as claimed in claim 1, wherein the tensioning cable extends from a front mechanical coupling device in the forward portion as far as a rear mechanical coupling device in the rear portion.

3. The folding top as claimed in claim 1, wherein the fabric pocket is formed at least in sections at least in the rear portion of the folding top fabric.

4. The folding top as claimed in claim 1, wherein the folding top fabric and the tensioning cable are formed symmetrically or substantially symmetrically.

5. The folding top as claimed in claim 1, wherein the central portion has a window guide for a side window of the vehicle.

6. The folding top as claimed in claim 5, wherein the window guide encloses an acute angle with the tensioning cable.

7. The folding top as claimed in claim 1, wherein the tensioning cable is fastened to a rear tensioning bow arranged in the rear portion.

8. A vehicle having the folding top with the features of claim 1.

\* \* \* \* \*